Figure 1:
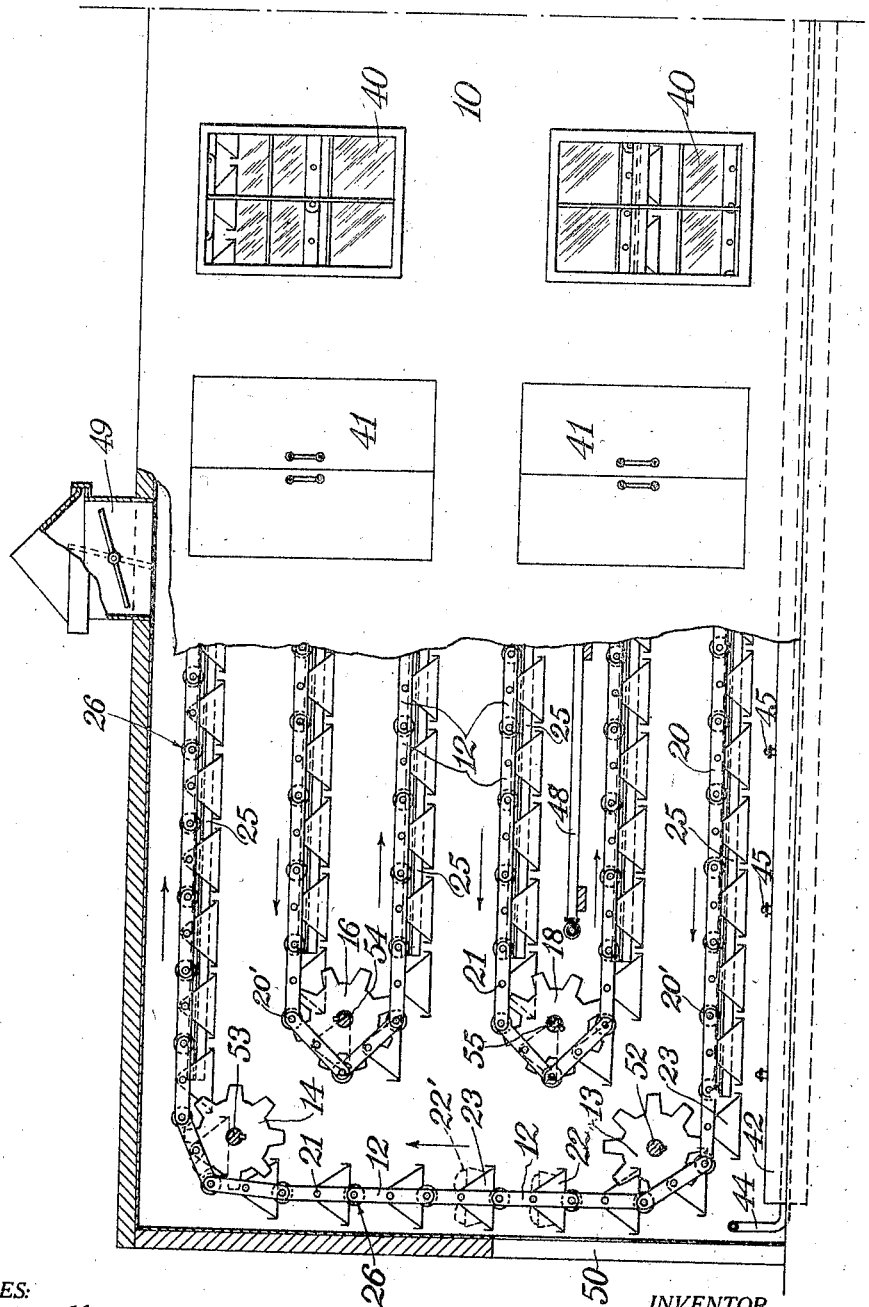
Figure 1:
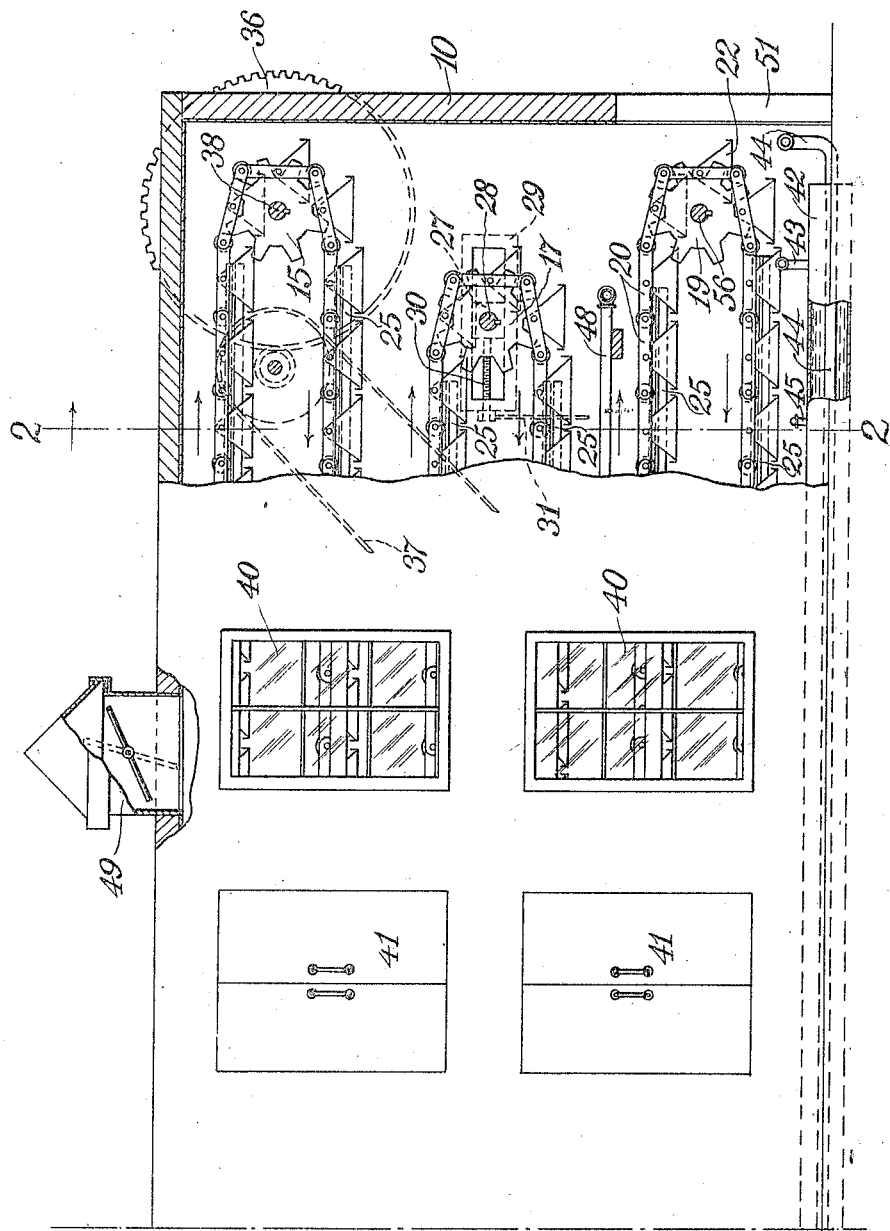

F. G. BIRD.
DOUGH RAISING MACHINE.
APPLICATION FILED JULY 14, 1913.

1,092,089.

Patented Mar. 31, 1914.
3 SHEETS—SHEET 1.

WITNESSES:

INVENTOR.
Frank G. Bird.
BY
ATTORNEY.

F. G. BIRD.
DOUGH RAISING MACHINE.
APPLICATION FILED JULY 14, 1913.

1,092,089.

Patented Mar. 31, 1914.

3 SHEETS—SHEET 2.

WITNESSES:
N. E. Hartwell.
Caroline N. Willis

INVENTOR.
Frank G. Bird.
BY
Chapin & Co.
ATTORNEY.

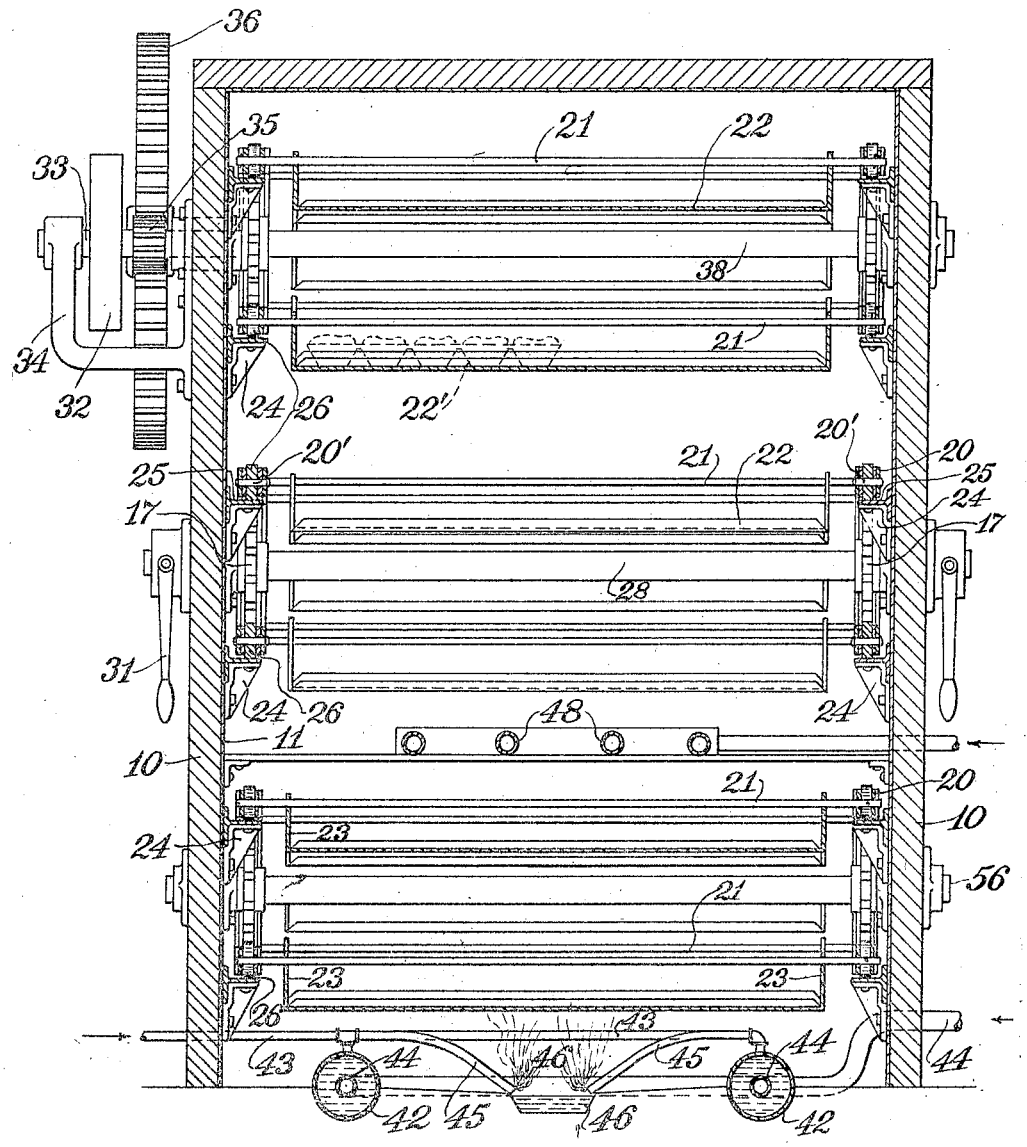

UNITED STATES PATENT OFFICE.

FRANK G. BIRD, OF SPRINGFIELD, MASSACHUSETTS.

DOUGH-RAISING MACHINE.

1,092,089.

Specification of Letters Patent. Patented Mar. 31, 1914.

Application filed July 14, 1913. Serial No. 778,913.

*To all whom it may concern:*

Be it known that I, FRANK G. BIRD, a citizen of the United States of America, residing at Springfield, in the county of Hampden and State of Massachusetts, have invented certain new and useful Improvements in Dough-Raising Machines, of which the following is a specification.

This invention relates to improvements in bread making machines and particularly in machines for raising or ripening the dough prior to the baking process. It is designed to subject the dough, which has been previously placed in the baking tins, to a definite temperature and moisture for a predetermined period for the purpose of causing the dough to rise or ripen by reason of the yeast contained therein whereby at the end of this raising process the dough is in the required chemical condition for baking. That is to say, the yeast contained in each individual quantity of dough has had the necessary length of time to cause the dough to rise or ripen prior to the baking process.

The invention in general comprises an inclosing casing or chamber within which is located an endless carrier or conveyer to which are attached shelves that are adapted to receive the tins containing the dough that is to be subjected to the raising or ripening process. Suitably located within this casing is a tank containing water and provided with means for heating the water so that a definite quantity of moisture will escape therefrom and completely fill the interior of the casing with a saturated vapor. This saturated vapor causes the dough or pasty mass to assume a soft or pliable condition so that, when the same is transferred to the baking ovens after the raising process, it will not be in a dry or crusty condition.

An object of the invention is to maintain the upper part of the casing at a higher temperature than the lower part, and the endless conveyer is so arranged that the dough is initially subjected to this higher temperature immediately after being placed therein, and, as it travels back and forth through the chamber, it will successively come into contact with moistened air that is lower in temperature. The temperature at the delivery end is very much lower than at the entrance end of the machine. In practice, it has been found that the temperature in the upper part of the casing should be about 130° F. and at the lower or delivery end the temperature should be about 90° F. which is a difference of 40° for the ripening process, and it also has been found in practice that the process should continue for a period of substantially forty-eight minutes in order to thoroughly ripen or raise the dough.

Referring to the drawings:—Figures 1 and 1ª designate the inclosing casing of the machine. The two figures represent a continuous casing, Fig. 1 showing the entrance end of the casing where the loaves of dough are inserted after being placed in the baking tins, and Fig. 1ª at the right-hand portion designating the delivery end of the casing where the loaves are removed and are then passed immediately to the baking ovens, the broken away portions of the two figures representing the manner in which the endless conveyer is mounted within the casing. Fig. 2 is a transverse sectional view on the line 2—2 of Fig. 1ª showing the pendant shelves that are carried by the endless-conveyer, the supporting-brackets on which the anti-friction rollers of the conveyer chain travel, also the water tanks at the lower part of the casing for supplying the requisite amount of moisture and the steam pipes for maintaining the water at a definite temperature.

Referring to the drawings in detail, 10 designates the inclosing casing that is preferably made of wood of a suitable kind. 11 designates the lining of the casing which usually consists of sheet zinc. This lining is for the purpose of preventing the moisture from gaining access to the casing, and it also furnishes a suitable metal that can be readily cleansed or washed when required to maintain the casing in a sanitary condition. Located within the casing is an endless-conveyer 12 that is suitably supported on sprocket-wheels 13, 14, 15, 16, 17, 18, and 19 which are mounted on transversely arranged rods or shafts which turn in bearings secured to the sides of the casings, as shown. The sprocket-wheels 13 and 14 are located at the entrance or receiving end of the casing and the sprocket-wheels 15, 17, and 19 are located at the opposite or delivery end of the casing, while the two intermediate sprocket-wheels 16 and 18 are located at the receiving end but farther from the end of the casing than the wheels 13 and 14, as shown. The conveyer is made up of links 20 that are pinned together as indicated at 20'. The links 20 are connected together on opposite sides of the machine by means of the bars or rods 21, it being understood that the conveyer is duplicated on both sides of the casing. Depending from the rods 21 are the pendant shelves 22 which are supported from the rods 21 by means of the upturned ends 23. These hangers or shelves are designed to receive the tins containing the loaves of dough that are to be raised or ripened while passing back and forth within the casing.

In order that the two sides of the conveyer may always be maintained in a horizontal position to prevent the loaves as they rise from assuming an uneven or one-sided shape, the conveyer chains are supported on brackets 24 which are bolted or otherwise secured to the inside of the casing. These brackets support horizontally arranged track-ways 25 which project inwardly from the sides of the casing.

26 designates antifriction rollers or wheels carried by the chain-connecting-pins 20' and which rest upon the track-ways 25. In order to maintain the endless-conveyer at the proper tension, provision is made for tightening or taking up the slack in the same. This tension device comprises a block 27 through which the shaft 28 of the sprocket-wheels 17 passes and is located in a bearing member 29 from which projects a threaded rod 30 that extends through a threaded opening in the member 29.

31 designates a handle that is connected to the rod 30 whereby, when the handle 31 is rotated, the block 27 can be moved in the bearing 29 to take up any slack in the conveyer-chain.

The motive power to operate the conveyer is connected to a pulley 32 which is mounted on the shaft 33 in the bracket 34. This shaft carries the pinion 35 which meshes with the spur-gear 36. Any suitable motive power can be belted to the pulley 32 as indicated in Fig. 1ᵃ at 37. The ratio of rotation between the pinion 35 and the gear 36 is such that a very slow movement is imparted to the driving-shaft 38. For the purpose of inspecting the raising process of the dough, suitable windows are provided as indicated in Figs. 1 and 1ᵃ at 40, and, in order to gain access to the interior of the casing for purposes of repair or cleansing, suitable doors are provided as indicated at 41.

Referring now to the means for imparting definite degree of moisture to the interior of the casing, whereby the dough undergoing the raising process will be subjected to the correct amount of moisture, tanks 42 as shown are located in the bottom part of the casing and extending longitudinally thereof.

43 is a pipe connected to the tanks 42 for supplying cold water thereto from any suitable source of supply as from the city water mains.

44 designates a steam pipe which extends lengthwise of and within the tanks 42 whereby the water therein may be raised and maintained at a definite temperature. The tanks are provided with a suitable number of overflow pipes 45 which discharge hot water into a suitable drain or trough 46. These overflow pipes are located on and connected to the upper side of the tanks 42 as shown, and terminate with their open ends at the trough 46. These pipes and the open trough 46 are for the purpose of supplying the interior of the casing with the desired amount of saturated vapor or moisture which will ascend from the open trough 46 and from the open ends of the pipes 45 as indicated at 46'. Also located within the casing are steam pipes 48 which are for the purpose of furnishing a dry heat should the quantity of moisture contained within the casing be too great.

49 designates a ventilator that is located in the upper part of the casing and is designed for the purpose of varying the temperature and the quantity of moisture contained within the casing as it will be readily seen that, when the ventilators are open wide, the interior can be readily cooled.

Referring now to the operation of the machine, it being understood the dough has previously been subjected to the first raising process that the dough which is to be subjected to the second raising process has already been divided up into definite and equal quantities and previously placed in the baking tins for this second raising or ripening process, the workman passes the tins containing the dough through the entrance opening 50 and places the same on the pendant shelves 22 of the conveyer as indicated in Fig. 2 at 22'. The loaves of dough then travel in succession upward along the top portion of the casing, then return, and then forward again, and so on continuously until they reach the delivery opening 51 at the opposite end of the casing where they are removed from the shelves 22 and placed in the baking oven. It will be seen from this description that each quantity of dough is subjected to exactly the same raising or ripening process, as each tin remains in the inclosing casing exactly the same length of time and is subjected to exactly the same conditions and the result is that a product that is uniform is produced.

The presence of moisture within the casing causes the dough or pasty mass to remain soft and pliable during the raising process; if the air within the interior of the casing was dry, the pasty mass would not present a uniform appearance at the end of the raising process but would contain ridges and openings. The presence of moisture is designed to overcome this objection.

In order to prevent the conveyer-chain from binding on the sprocket-wheels when in operation, it is desirable to provide means to compensate for the difference in travel between the opposite sides of the conveyer should any occur. This is accomplished by keying, or otherwise securing, all of the sprocket-wheels on one side to the shafts 52, 53, 54, 55, 38, 28, and 56. On the opposite ends of these shafts, the sprocket-wheels turn loosely. By means of this arrangement, the links will always correctly engage the teeth of the sprockets and the rods 21 will always remain parallel with each other.

What I claim is:—

1. In a machine of the class described, the combination with an inclosing casing of a plurality of track-ways secured to the inner sides thereof, an endless conveyer provided with anti-friction rollers engaging the trackways, of shelves freely suspended from said conveyer, means for operating the conveyer, a longitudinally extending tank arranged within the casing, a pipe connected thereto for supplying water to the interior of the tank, a pipe located within the tank to maintain the water at a definite temperature, outlet pipes connected to the tank for furnishing the interior of the casing with moisture, a means to heat the interior of the casing, a ventilator arranged in the upper end of the casing for regulating the quantity of moisture and the temperature, the opposite ends of the casing being formed with receiving and delivery openings whereby when a pasty or spongy mass is carried on the endless conveyer in reverse directions therein, it will be subjected to a definite temperature and moisture during the ripening process.

2. In a machine of the class described for subjecting a pasty or a spongy mass to a ripening process and comprising in combination, an inclosing casing an endless-conveyer located therein, to receive the mass, means to support said conveyer and arranged in different horizontal planes, means to cause the conveyer to travel in reverse directions and through portions of the casing at different temperatures, the opposite ends of the casing having receiving and delivery openings, the conveyer at the receiving end extending first upward to the upper part of the casing at which point the temperature of the heated air within the interior of the casing is the highest, and carrying the mass to be ripened gradually downward to the lower part of the casing adjacent the delivery opening where the temperature of the air within the casing is the lowest, means to supply moisture and heat to the interior of the casing whereby the pasty or spongy mass is subjected to definite temperatures and a predetermined degree of moisture, as described.

3. A dough-raising or tempering machine comprising an inclosing casing, an endless-conveyer located therein, devices to support the conveyer in different horizontal planes, the initial horizontal travel of the conveyer being located in the uppermost part of the casing where the temperature of the heated air therein is the highest and the succeeding horizontal portions of its travel being located in successively lower and different horizontal planes to cause the spongy mass to be subjected to successive and decreasing degrees of heat during its travel, means to supply heat, and means to supply moisture to the interior of the casing, and means to operate the conveyer.

4. An air and moisture tempering or curing machine for pasty or spongy masses, comprising a metal lined casing, track-ways secured to the interior sides thereof and in different horizontal planes, an endless-conveyer provided with rollers engaging the track-ways, rods connecting the conveyers, shelves, supported by and depending from the rods, to receive the mass to be cured or tempered, tanks to contain a liquid and located within the bottom portion of the casing to supply the requisite quantity of moisture to the interior of the casing to maintain the mass in a pliable condition, means for heating the liquid, means for supplying heat to the interior of the casing, and means to operate the conveyer, the casing being formed with receiving and delivery openings at the opposite ends thereof and arranged in the same horizontal plane, as described.

FRANK G. BIRD.

Witnesses:
 HARRY W. BOWEN,
 CAROLINE W. WILLIS.